Patented Jan. 2, 1940

2,185,184

UNITED STATES PATENT OFFICE 2,185,184

THIOCYANO-ALKYL ETHERS OF ALKYL-HALO-PHENOLS

Gerald H. Coleman and Clarence L. Moyle, Midland, Mich., assignors to The Dow Chemical Comany, Midland, Mich., a corporation of Michigan No Drawing. Application October 26, 1938, Serial No. 237,059

9 Claims. (Cl. 260—454)

The present invention concerns a new class of compounds, namely, the thiocyano-alkyl ethers of the alkyl-halo phenols. These compounds are for the most part viscous, high-boiling, water-white liquids substantially insoluble in water, soluble in most petroleum distillate fractions, and somewhat soluble in organic solvents generally. We have prepared representative members of this group of compounds and found that they are useful as insecticidal toxicants, particularly when dissolved in petroleum distillate fractions.

Our new compounds may be prepared by reacting a halo-alkyl ether of an alkyl-halo phenol with an alcoholic suspension of an alkali metal thiocyanate. For example, an ether such as beta-(2-chlor-4-tertiarybutyl-phenoxy)-ethyl chloride and potassium thiocyanate are dispersed in absolute alcohol and the resulting mixture heated to its boiling temperature and under reflux for a period of time sufficient to accomplish reaction. The reaction temperature is generally between about 75° and 90° C., although somewhat lower or higher temperatures may be employed, the reaction being carried out under autogenous pressure where temperatures above the boiling point of the solution prevail. While any suitable proportions of the halo-alkyl-aryl ethers and metal thiocyanate may be employed, substantially equimolecular proportions thereof have been found to give the desired compounds in good yield. The alcohol may be employed in amount sufficient to retain the reactants and final ether product in solution. Following completion of the reaction, the desired thiocyano ether compound is separated in any suitable manner. For example, the major part of the alcohol solvent may be distilled out of the reaction mixture, and the residue diluted with water, whereupon a water-immiscible layer of the thiocyano-alkyl ether of the alkyl-halo phenol separates from solution. If desired, this compound may be recovered by extraction with a suitable solvent as benzene, the extract being fractionally distilled. In an alternate procedure, the water-immiscible layer may be separated as by decantation, washed with water, and used as an insecticidal toxicant without further purification, or such crude washed product may be purified.

The halo-alkyl ethers employed as reactants in the preparation of new compounds may be obtained by reacting suitable metal phenolates with dihalo aliphatic hydrocarbons under such conditions of temperature and pressure as favor the replacement of a single halogen atom by the alkyl-halo-phenoxy group. Co-pending application Serial No. 139,580, filed April 28, 1937 by Coleman et al. describes the preparation of certain of these halo-alkyl ether compounds.

The following examples disclose in detail the preparation of a number of compounds falling within the scope of our invention, but are not to be construed as limiting the same:

Example 1

A mixture of 72 grams (0.292 mol) of beta-chloro-ethyl ether of 2-bromo-4-ethyl phenol (boiling point 152°–154° C. at 8 millimeters pressure), 22 grams (0.292 mol) of potassium thiocyanate, and 290 milliliters of absolute alcohol was heated to its boiling temperature of 79° to 81° C. and under reflux for 48 hours. The mixture was then distilled to remove the major part of the alcohol solvent and the residue poured into an excess of water with stirring. A water-immiscible layer was separated from the water mixture by extraction with benzene and the extract washed with water, dried over magnesium sulfate, and fractionally distilled. 20 grams of beta-thiocyano-ethyl ether of 2-bromo-4-ethyl phenol was thereby obtained as a colorless liquid boiling at 170° to 171° C. at 2 millimeters pressure and having the specific gravity 1.410 at 20°/4° C. A 3 per cent solution of this compound in kerosene, when tested by the Peet-Grady method, substantially as described in Soap, 8, No. 4, 1932, gave a knockdown of 100 per cent in 10 minutes and a kill of 92 per cent in 48 hours against three-day old house flies.

Example 2

In a similar manner, 100 grams (0.363 mol) of the gamma-chloro-isobutyl ether of 2-chloro-4-tertiarybutyl phenol (boiling at 165° to 167° C. at 3 millimeters pressure), 30 grams (0.4 mol) of potassium thiocyanate, and 400 milliliters of absolute alcohol were mixed together and refluxed at 79° to 81° C. for 48 hours. The reaction product was fractionally distilled to obtain the gamma-thiocyano-isobutyl ether of 2-chloro-4-tertiarybutyl phenol as a viscous liquid boiling at 184° to 185° C. at 2 millimeters pressure and having a specific gravity of 1.223 at 20°/4° C. A 3 per cent kerosene solution of this compound, when tested as described in the preceding example, gave a knockdown in 10 minutes of 96 per cent and a kill in 48 hours of 93 per cent of three-day old house flies.

*Example 3*

56 grams (0.208 mol) of beta-bromo-ethyl ether of 2-chloro-4-tertiarybutyl phenol (boiling at 166° to 172° C. at 7.5 millimeters), 20.5 grams (0.208 mol) of potassium thiocyanate, and 100 millimeters of absolute alcohol were mixed together and heated to a reflux temperature under atmospheric pressure for 4 hours. The mixture was then cooled, filtered to remove potassium bromide, and fractionally distilled, whereby there was obtained the beta-thiocyano-ethyl ether of 2-chloro-4-tertiarybutyl phenol as a yellow-tinged, mobile oil boiling at 230° to 235° C. at 20 millimeters pressure and having a specific gravity of 1.168 at 25°/4° C.

*Example 4*

20.9 grams (0.062 mol) of beta-bromo-ethyl ether of 5-bromo-carvacrol (boiling at 159° to 170° C. at 7.6 millimeters pressure), 6.05 grams (0.062 mol) of potassium thiocyanate, and 50 milliliters of absolute ethyl alcohol were mixed together and refluxed at 85° C. (liquid temperature) for 4 hours. The reaction product was then cooled, diluted with 600 milliliters of water, and the resulting oil layer extracted with ethylene dichloride. The extract was fractionally distilled, whereby there was obtained a beta-thiocyano-ethyl ether of 5-bromo-carvacrol fraction boiling at 203°–208° C. at 5 millimeters pressure and having a specific gravity of 1.387 at 25°/4° C.

In a similar manner, alkali metal thiocyanates may be reacted with other halo-alkyl ethers of alkyl-halo phenols to obtain the thiocyano-alkyl ethers of such phenols as trichloro-meta-cresol, 2,6-dichloro-4-ethyl phenol, 4-chloro-2,5-dimethyl phenol, 2-chloro-4-n-amyl phenol, 2-chloro-4-tertiary-butyl-6-methyl phenol, 2-chloro-4-teritary-octyl phenol, 4-bromo-ortho-cresol, 2,4-dimethyl-6-bromo phenol, 2,6-dibromo-4-tertiarybutyl phenol, 2,4-dichloro-6-bromo-meta-cresol, iodocresol, 2,4-dibromo-thymol, and the like. The ether compounds which may be so prepared include beta-thiocyano-ethyl ethers, beta-thiocyano-propyl ethers, gamma-thiocyano-propyl ethers, gamma-thiocyano-isobutyl ethers, thiocyano-pentyl ethers, and the like.

We claim:

1. A thiocyano-alkyl ether of an alkyl-halo phenol.
2. A thiocyano-alkyl ether of a mono-alkyl-mono-halo phenol.
3. A thiocyano alkyl ether of a dialkyl mono-halo phenol.
4. A thiocyano-alkyl ether of an alkyl-halo phenol, wherein the alkyl residue of the thiocyano-alkyl group contains from 2 to 5 carbon atoms, inclusive, and the alkyl substituents on the benzene ring contains from 1 to 8 carbon atoms, inclusive.
5. A beta-thiocyano-ethyl ether of an alkyl-halo phenol.
6. A beta-thiocyano-ethyl ether of an alkyl-bromo phenol.
7. A beta-thiocyano-alkyl ether of an alkyl-chloro phenol.
8. Beta-thiocyano-ethyl ether of 2-chloro-4-tertiary-butyl phenol.
9. A beta-thiocyano-ethyl ether of bromo-carvacrol.

GERALD H. COLEMAN.
CLARENCE L. MOYLE.